United States Patent
Qian et al.

(10) Patent No.: US 7,468,951 B2
(45) Date of Patent: Dec. 23, 2008

(54) METHOD AND SYSTEM FOR EVALUTING NUMBER OF ADDITIONAL ADMISSIBLE CALLS FOR USE IN CALL ADMISSION CONTROL

(75) Inventors: Lu Qian, Solon, OH (US); Bretton Douglas, San Jose, CA (US); David Sheldon Stephenson, San Jose, CA (US); Sandeep Jay Shetty, San Jose, CA (US); Rajneesh Kumar, San Jose, CA (US); Wenfeng Huang, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 612 days.

(21) Appl. No.: 11/049,793

(22) Filed: Feb. 2, 2005

(65) Prior Publication Data

US 2006/0171314 A1 Aug. 3, 2006

(51) Int. Cl.
*H04L 12/26* (2006.01)
*H04L 12/28* (2006.01)
*H04L 12/50* (2006.01)
*H04Q 7/00* (2006.01)
*H04J 3/16* (2006.01)

(52) U.S. Cl. .............. 370/252; 370/254; 370/230; 370/351; 370/389; 370/465; 370/468

(58) Field of Classification Search .............. 370/468, 370/389, 465, 351, 352, 328, 252, 254, 230
See application file for complete search history.

(56) References Cited

U.S. PATENT DOCUMENTS

| | | | |
|---|---|---|---|
| 5,884,174 A | 3/1999 | Nagarajan et al. | |
| 6,292,471 B1* | 9/2001 | Cao et al. | 370/252 |
| 6,459,681 B1* | 10/2002 | Oliva | 370/232 |
| 6,657,957 B1 | 12/2003 | Cheung et al. | |
| 6,735,172 B1 | 5/2004 | Gibbs et al. | |
| 6,842,618 B2* | 1/2005 | Zhang | 455/452.1 |
| 7,106,708 B2* | 9/2006 | Lu | 370/329 |
| 2004/0120293 A1* | 6/2004 | Hassan et al. | 370/338 |

OTHER PUBLICATIONS

An Efficient QoS Scheme for Mobile Hosts☐☐Paskalis et al. ☐☐Published in 2001.*
Handbook of Emerging Communications Technologies: the Next Decade. ☐☐Ed. Saba Zamir☐☐CRC Press LLC, 2000.*

(Continued)

*Primary Examiner*—Steven H Nguyen
*Assistant Examiner*—Nishant B Divecha
(74) *Attorney, Agent, or Firm*—Cindy Kaplan

(57) ABSTRACT

A method for evaluating number of additional admissible calls for use in call admission control includes tracking a percentage of channel busy time and transmission time of downlink and uplink voice packets, receiving a call admission request, and calculating the number of admissible calls. The number of admissible calls is calculated based on a channel bandwidth requirement determined from the percentage of channel busy time and a voice packet queuing requirement determined from the transmission time of downlink and uplink voice packets. The call admission request is approved if the number of admissible calls is greater than one and rejected if the number of admissible calls is less than one.

20 Claims, 4 Drawing Sheets

OTHER PUBLICATIONS

Dynamics of Path Losses Between a Mobile Terminal and Multiple Base Stations in a Cellular Environment—Sayandev Mukherjee, Member, IEEE, and Dan Avidor, Member, IEEE, 2001.*

Reconciling the Characteristics of Wired and Wireless Networks: The Janus Approach—Vaidy Sunderam, James Pascoe and Georgi Tonev 2002.*

Light Weight Access Point Protocol (LWAPP)—Network Working Group Internet Draft—May 8, 2004.*

Call Admission Control for IEEE 802.11 Contention Access Mechanism—Dennis Pong and Tim Moors 2003.*

VoIP Call Admission Control—Aug. 2001.*

Adaptive call admission control for QoS provisioning in multimedia wireless networks—F. Prihandoko, M.H. Habaebi, B.M. Ali—Received Jul. 1, 2002; revised Oct. 22, 2002; accepted Nov. 7, 2002.*

Network Bandwidth Allocation and Admission Control for a Continuous Media File Server—Dwight Makaroff, Gerald Neufeld, and Norman Hutchinson.*

Body, Personal, and Local Ad Hoc Wireless Networks—Marco Conti 2003.*

A Discussion of Bandwidth Broker Requirements for Internet2 Qbone Deployment—Rob Neilson, BCIT—Jeff Wheeler, Nortl—Francis Reichmeyer, IPHighway—Susan Hares, Merit—Aug. 1999.*

ENICOM"S Bandwidth Broker—Hashmani et al. 2001.*

Achieving Efficient Channel Utilization and Weighted Fairness for Data Communications in IEEE 802.11 WLAN under the DCF—Shin et al 2002.*

Reource Reservation Protocol (RSVP)—Handbook of Emerging Communication technologies, Sonia Fahmy and Raj Jain, 2000.*

Ethernet/IP Performance Metricsm James Gilsinn, Jun. 4, 2002.*

\* cited by examiner

METHOD AND SYSTEM FOR EVALUTING NUMBER OF ADDITIONAL ADMISSIBLE CALLS FOR USE IN CALL ADMISSION CONTROL

BACKGROUND OF THE INVENTION

The present invention relates generally to communication networks, and more particularly, to call admission control in wireless networks.

In recent years wireless networks have gained popularity and have been widely deployed. With fast deployment of wireless local area networks (WLANs), the ability of WLAN to support real time services while maintaining quality of service (QoS) requirements has become an important issue. In order to support a wide range of traffic on a wireless network, the infrastructure must be capable of supporting various quality of service (QoS) requirements, including call admission. Call admission control (CAC) plays a significant role in providing the desired quality of service in wireless networks. CAC limits the number of call connections into the network in order to reduce network congestion and call dropping. CAC operates to maximize the use of available bandwidth, either in calls accepted or traffic scheduled according to channel utilization, while minimizing a blocking probability for new calls and call drop probability for connected calls.

IEEE 802.11 covers the media access control (MAC) layer and physical layer specifications for WLANs. The physical properties of the wireless medium and 802.11 MAC protocols impose an upper boundary on the number of admissible wireless voice over IP (WVoIP) calls a wireless network (WLAN) can support (i.e., the call capacity). The call capacity depends on many factors, including, for example, channel conditions, background data traffic loads, and multi-BSS (basic service set) interference. Admission of even one more call than the call capacity can bring the WLAN from stable to unstable, causing a significant degradation of the voice quality of admitted calls. CAC must therefore be in place to ensure the quality of service.

The call capacity for a network varies with network conditions and configurations. Metrics for use in CAC decisions, therefore, need to adjust to changes in wireless medium conditions and network traffic conditions. Local channel conditions which need to be accounted for, include foreign interference (e.g., from microwave radios, Bluetooth radios, etc.) that may only affect one or two access points (APs) rather than an entire WLAN. Also, frequency reuse in the WLAN may reduce the number of calls per AP as several APs can share the RF channel and its capacity. The amount of channel overlap may be difficult to predict due to the wide variety of deployments and radio propagation conditions found therein.

The call capacity or equivalently the number of additional admissible calls, Na, given a certain number of admitted calls is a promising metric for a reliable CAC procedure. However, the call capacity and Na depend on many aspects of the network conditions, including, for example, the wireless channel conditions, background data traffic loads, and QoS capabilities of the WLAN. These dependencies are often numerically intangible and only WLAN simulations can provide an answer for a given network condition. In field deployments, the combinations of wireless network conditions are unlimited, making it unrealistic to use metrics predetermined by network simulations. In addition, network conditions for a WLAN often change with time, thus making evaluating the call capacity or Na even more challenging.

Many CAC schemes have been proposed. Many of these schemes use metrics such as delay, jitter, and packet loss rate. However, these metrics do not possess the desired properties discussed above, and do not provide an optimal call admission decision. Moreover, existing CAC metrics do not provide predictive measurements, which allow the CAC to predict the impact of the admission of new calls on a WLAN before it actually admits the call. Furthermore, conventional CAC schemes often make the implementation complex and lead to performance degradation.

There is, therefore, a need for a dynamic and predictive method and system for use in call admission control to evaluate the number of additional calls that can be admitted without degrading the voice quality of admitted calls.

SUMMARY OF THE INVENTION

A method for evaluating number of additional admissible calls for use in call admission control generally comprises tracking a percentage of channel busy time and transmission time of downlink and uplink voice packets, receiving a call admission request, and calculating the number of admissible calls. The number of admissible calls is calculated based on a channel bandwidth requirement determined from the percentage of channel busy time and a voice packet queuing requirement determined from the transmission time of downlink and uplink voice packets. The call admission request is approved if the number of admissible calls is greater than one and rejected if the number of admissible calls is less than one.

A system for evaluating number of additional admissible calls for use in call admission control generally comprises a metrics measurement module and an admission control module. The metrics measurement module is operable to track a percentage of channel busy time and transmission time of downlink and uplink voice packets. The admission control module is operable to receive a call admission request, calculate the number of admissible calls based on a channel bandwidth requirement determined from the percentage of channel busy time, and a voice packet queuing requirement determined from the transmission time of downlink and uplink voice packets, and approve the call admission request if the number of admissible calls is greater than one and reject the call admission request if the number of admissible calls is less than one.

Further understanding of the nature and advantages of the inventions herein may be realized by reference to the remaining portions of the specification and the attached drawings.

BRIEF DESCRIPTION OF THE DRAWINGS

Corresponding reference characters indicate corresponding parts throughout the several views of the drawings.

DESCRIPTION OF SPECIFIC EMBODIMENTS

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and system for evaluating the number of additional admissible calls for use in call admission control (CAC) are disclosed herein. The number of additional admissible calls is based on network requirements for WVoIP. By keeping track of the percentage of channel busy time and the transmission time of downlink and uplink voice packets, an AP (access point) is able to efficiently evaluate the number of additional admissible calls so as to safely make a real-time CAC decision without running the risk of adversely affecting the admitted calls. The method and system may be applied extensively to WVoIP in both large enterprise environments and small or medium business environments.

Figure 1:
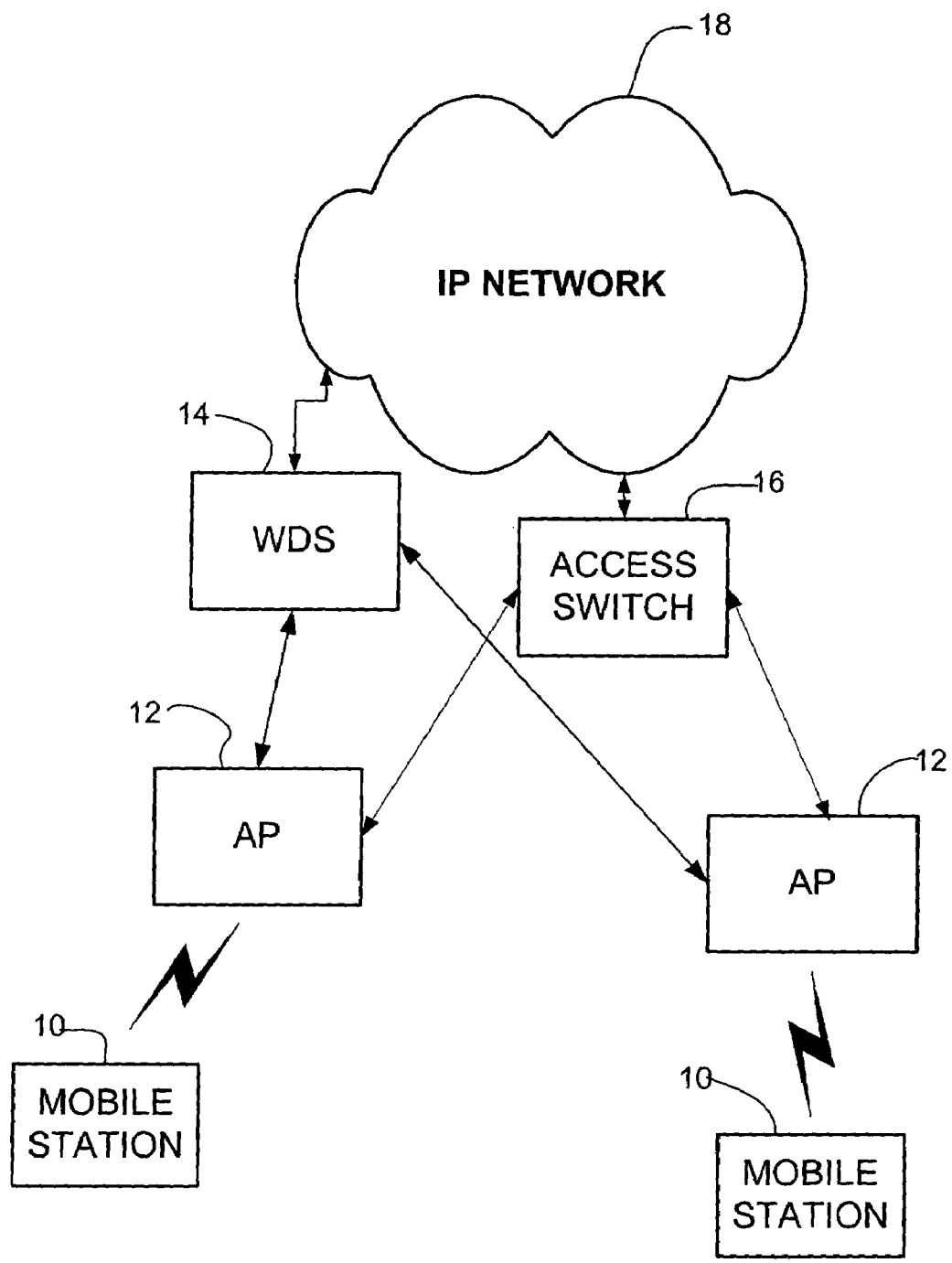
FIG. 1 is a diagram illustrating an exemplary wireless communication system.

FIG. 1 illustrates an example of a wireless communication network suitable for implementing one embodiment of the present invention. The wireless communication system facilitates two-way communication between a plurality of subscriber units (fixed and portable mobile stations) 10 and a fixed network infrastructure 18. Mobile stations 10 may be cellular telephones, personal communication systems such as personal digital assistants (PDAs), laptop computers, pagers, or other suitable wireless devices providing voice, video, data, and other wireless services to users. As shown in FIG. 1, the network includes one or more access points (APs) 12, one or more wireless domain services (WDSs) 14, one or more access switches (AS) 16, and multiple subscriber units (mobile stations) 10. The mobile stations 10 are in communication with the APs 12 and may also be in communication with one or more satellites to enable communication with one or more devices coupled to the IP network 18 or any other network. The mobile station 10 may also communicate directly with other devices, such as other mobile stations using suitable wireless communication techniques. Each access point 12 is in communication with WDS 14 and access switch 16. Multiple access points 12 may report to one WDS 14. The access points 12 are coupled to the IP network 18 and allow mobile stations 10 to communicate with other devices coupled to the WLAN. The WLAN may include, for example, access routers, core routers, and other network elements, as is well known by those skilled in the art. The network may include any number of subnetworks and routers, and the subnetworks can form a network topology other than LAN, such as a wide area network, an enterprise network, and a metropolitan area network, for example.

It is to be understood that the network shown and described herein is only one example and that the present invention may be implemented in any telecommunication network utilizing call admission control policies. For example, the method and system described herein may be used with packet data other than IEEE standard 802.11.

In order to provide sufficient quality of service for voice packets, only a certain amount of voice bandwidth can be serviced or admitted by the AP 12. If the amount of voice traffic is increased beyond this limit, the QoS of all calls would suffer. The method and system described herein utilize a CAC quality metric for QoS traffic that provides information sufficient to make call admission control decisions. These metrics are preferably made available to the access points 12 in relatively frequent intervals (e.g., 5 second intervals).

The call admission control function allocates bandwidth to client devices on a first-come, first-serve basis, and may also be used to maintain a small reserve so mobile phone clients can roam into a BSS (basic service set) (even though the BSS would otherwise be at full capacity). The CAC metrics may also be used to reserve a specified amount of bandwidth for voice or data. For example, fifty percent of a channel capacity may be reserved for voice and fifty percent reserved for data. The system may also be configured to set a priority to voice or data or used in real time video conferencing to prioritize critical data. The CAC metrics may also be used for load balancing at the WDS based on data received from the APs. A user interface (UI) may be provided to configure channel reservation for roaming or load balancing. The user interface may also display the number of admitted calls, number of additional admissible calls, or other metrics.

The metrics set forth below for use in making a CAC decision are dynamic since the call capacity for a network varies with the network conditions and configurations. The CAC metrics are configured to adjust to changes in wireless medium conditions and network traffic conditions and account for local channel conditions such as foreign interference (e.g., from microwave radios, Bluetooth radios, etc.) that may only affect one or two APs 12 and not the entire WLAN. The CAC metrics described herein are used to predict the impact of a new call on the WLAN before the system admits the call to reduce the chances of a new call causing the WLAN to become unstable.

The CAC metric is based on two requirements (conditions) for a stable WLAN involving the presence of voice clients; channel bandwidth and voice packet queuing, as described in detail below.

The channel bandwidth requirement ensures that there is enough channel bandwidth for voice packets. If a number (N) of calls have already been admitted in a basic service set (BSS), the available network bandwidth for additional admissible calls within a voice packet time interval (dT) is represented by:

$$dT*(1-Pb);$$

where:
dT: voice packet interval; and
Pb: % of channel busy time from an AP's perspective.

The voice packet interval dT is determined by a Codec in the voice clients and may be, for example, 20 ms. Pb is the percentage of time that the receiver is busy demodulating IEEE standard 802.11 traffic and includes the time the AP 12 transmits packets and the time the AP's clear channel assessment (CCA) reports that a channel is busy. If the WLAN can accommodate a number of additional calls (Na), the additional calls will take a network bandwidth of:

$$(T1\_u+T1\_d)*Na; \text{ and}$$

$$(T1\_u+T1\_d)*Na \leq dT*(1-Pb)$$

where:
Na: number of additional admissible calls;
T1_u: average transmission time for voice packets in an uplink;
T1hd —d: average transmission time for voice packets in a downlink; and
Pb: % of channel busy time from an AP's perspective.

T1_u and T1_d are the transmission time for voice packets starting when they reach the front end of their transmission queues to the time they receive an acknowledgement for the uplink and downlink respectively, measured and averaged over a sliding time window. T1_d is measured by the AP itself and T1_u is measured and reported to the AP by each voice client. The AP further averages T1_u over the number of voice clients. The retransmission of packets and the time in back-off are counted in the transmission time. When N=0, a predefined value may be used to estimate T1_u and T1_d since there are no AP or client measurements of T1_d and T1_u respectively as measurements are only made where a voice call is present.

The Na equations set forth above can be represented as:

$$Na \leq Na1;$$

where:

$$Na1 = dT*(1-Pb)/(T1\_u+T1\_d).$$

The following describes the voice packet queuing requirement. The rate that voice packets leave a transmission queue of a network node should be no slower than the arrival rate of voice packets. Otherwise the transmission queue for voice packets in a network node will be overloaded. For the AP, this requirement can be written as:

$$(N+Na)*T1\_d \leq dT$$

or $$Na \leq Na2;$$

where:

$$Na2 = dT/T1\_d - N.$$

A new CAC metric for use in defining the number of additional calls that can be supported is therefore defined as:

$$Na = \min(Na1, Na2);$$

where:

$$Na1 = dT*(1-Pb)/(T1\_u+T1\_d);$$

$$Na2 = dT/T1\_d - N.$$

If Na>1, then a new call can be admitted.

The CAC metric Na is determined by real-time measurable metrics and is therefore very accurate. Since Na is self-adaptive, it can dynamically adjust to changes in network conditions. For example, when the data traffic increases, the number of allowed calls can be lowered automatically. Na also includes other network factors, such as traffic load, channel conditions, and multi-cell interference.

Figure 2:
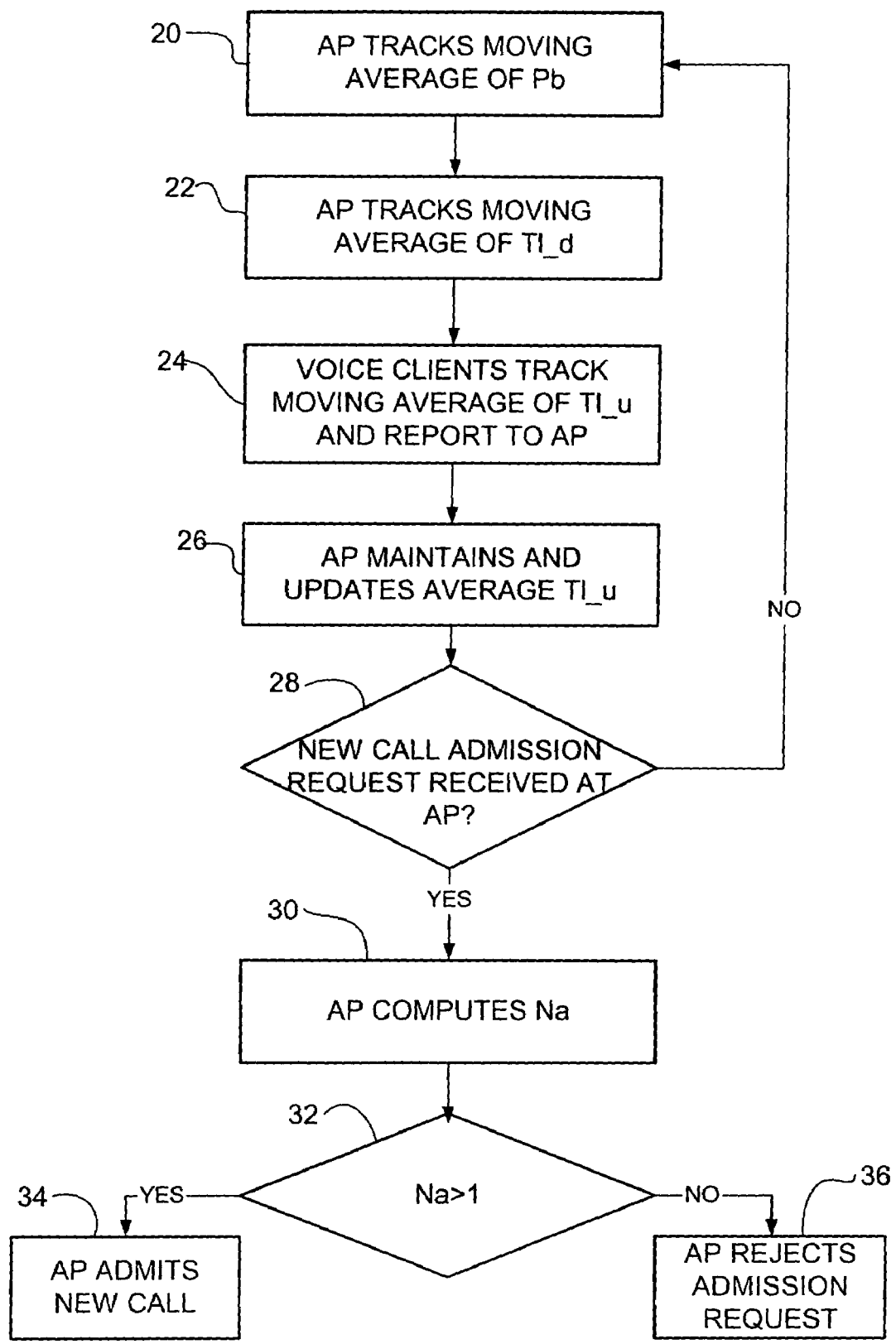
FIG. 2 is a flowchart illustrating one example of a process of the present invention for evaluating the number of additional admissible calls for use in call admission control.

FIG. 2 is a flowchart illustrating one example of a process of the present invention for evaluating the number of additional admissible calls for use in call admission control. At step 20, the AP keeps track of a moving average of Pb over a sliding time window. As described above, Pb is derived from the time the AP is in transmission and the time the AP's CCA reports busy. The AP also keeps track of a moving average of T1_d over a sliding time window (step 22). Each voice client keeps track of a moving average of its T1_u over a sliding time window and reports T1_u to the AP periodically (step 24). The AP maintains an average of T1_u over the number of received T1_u's within a sliding time window (step 26). Upon receiving a T1_u from a voice client, the AP adjusts the average T1_u it maintains accordingly. When the AP gets a new call admission request, it computes Na1, Na2 and Na from N, Pb, T1_u and T1_d by using the above formulas (steps 28 and 30). If Na is greater than 1, the AP can safely admit the new call (steps 32 and 34). If Na is less than or equal to 1, the AP rejects the admission request (steps 32 and 36).

It is to be understood that the process described above is only one example, and that the process may be modified without departing from the scope of the invention. For example, the method can easily be extended so that some call slots are reserved for roaming calls. The process may also be applied to admission control for other QoS applications such as video streams. Also, other co-channel APs can exchange information so that the total N (number of calls on the channel) is accounted for in the formula for Na2. In another embodiment, other co-channel APs can exchange information so that only Pb due to voice calls (and not best-effort data packets) is measured, thereby providing a more accurate estimate of Na. This may be important since EDCA will, to a large extent, prioritize voice and video, packets ahead of data packets. Also, the process may be extended to use different voice packet intervals other than 20 ms or even a mixture of intervals within a BSS.

Figure 3:
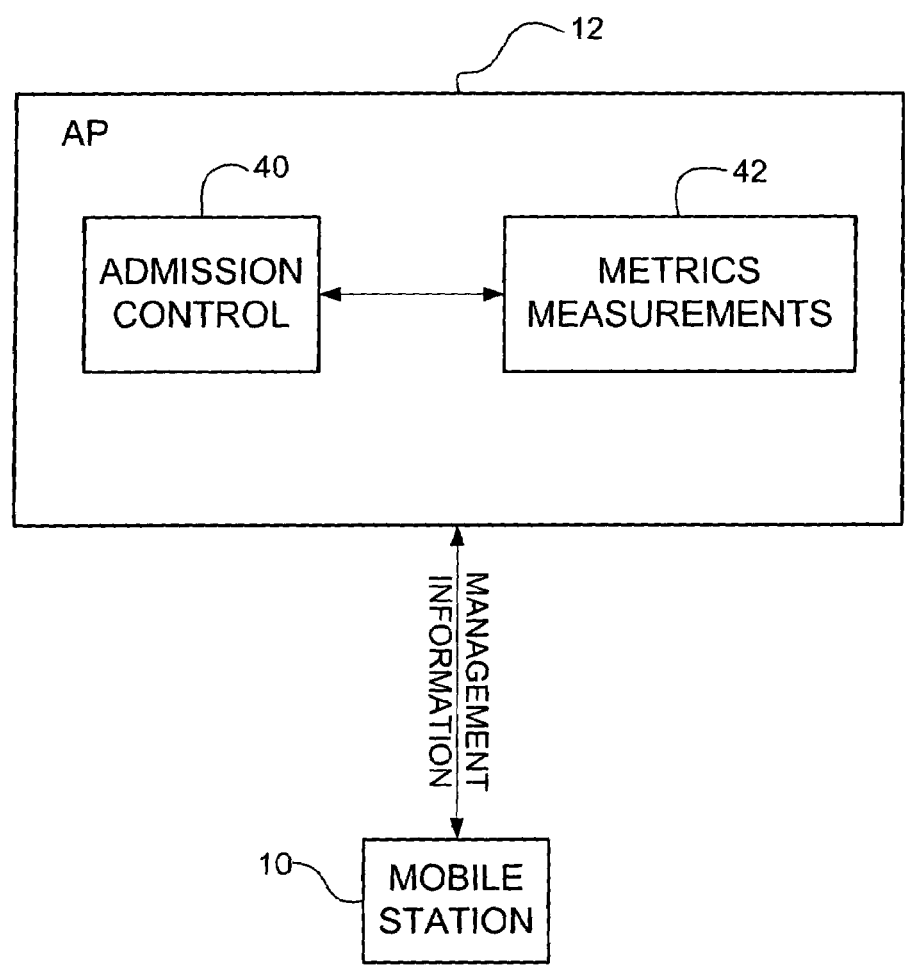
FIG. 3 is a block diagram illustrating components of an access point of the wireless communication system of FIG. 1.

FIG. 3 illustrates an admission control module 40 located within the AP 12 for calculation of the CAC metrics. A metrics measurement module 42 posts the latest measurement of metrics such as T1_u, T1_d, and Pb. The admission control module 40 computes Na from these values, as previously described. Information from the mobile stations 10 is transferred to the AP 12 as management information. The admission control and metrics measurement modules 40, 42 are shown in FIG. 2 as part of the AP 12. It is to be understood, however, that the admission control module 40 may also be located within the WDS 14. In this case, requests for voice metrics are sent to the APs 12 over the WDS 14. As the APs 12 receive the request for voice measurements, they respond to the WDS 14 with requested data.

The AP 12 (or WDS 14) collects the data and dynamically performs the calculations to determine the CAC metrics. If the AP 12 determines that the number of calls has reached its limit based on the CAC metrics, it rejects new requests and may direct the requests to other APs 12. The admission control module 40 may respond to a request with a bandwidth confirm message permitting a call to be placed or a bandwidth reject message refusing to make the necessary connection for the call.

Figure 4:
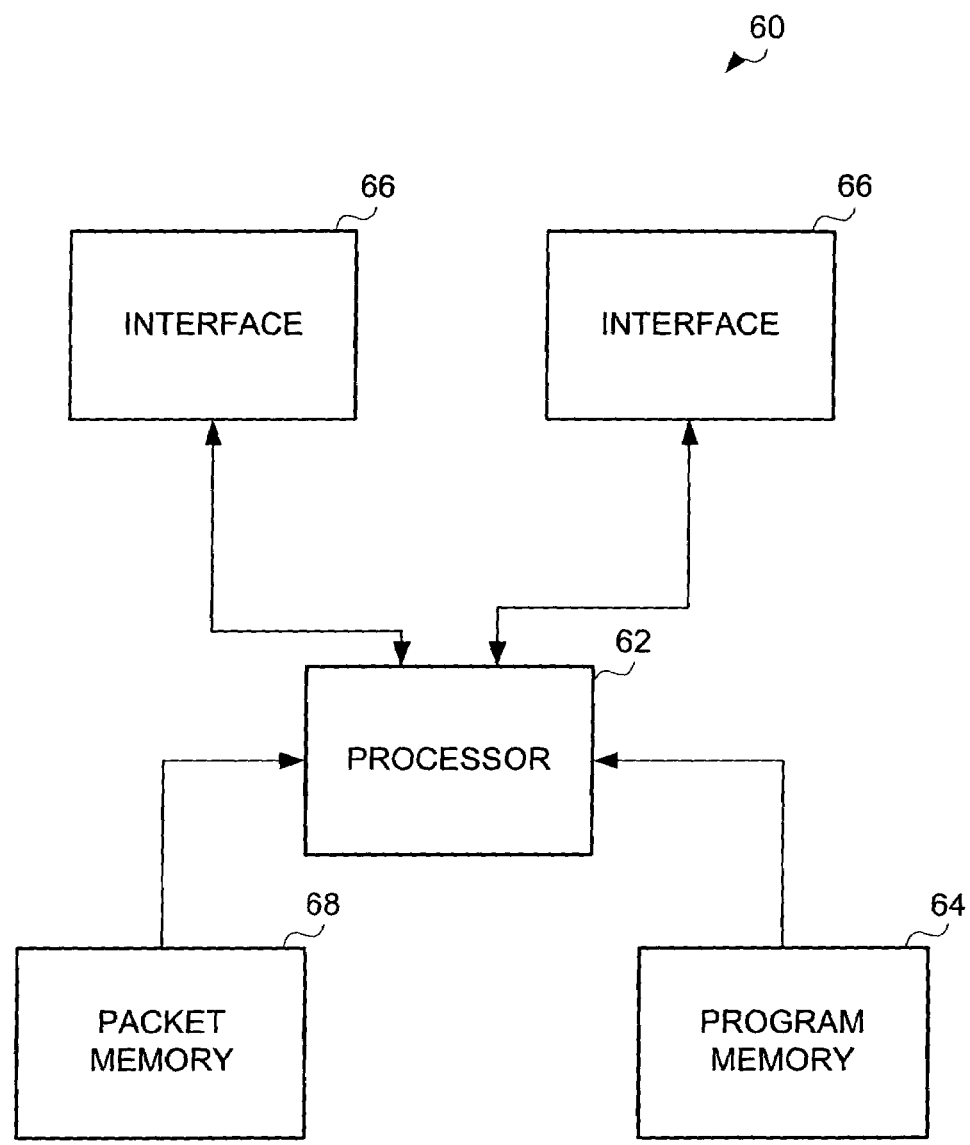
FIG. 4 is a block diagram of one example of a network device for use in implementing embodiments of the present invention.

The admission control module 40 may be a controller having a processor configured to execute software stored in memory and receive input from interfaces for use in executing the software, as described below with respect to FIG. 4, for example. FIG. 4 depicts a network device 60 that may be used to implement the method and system described above. In one embodiment, network device 60 is a programmable machine that may be implemented in hardware, software, or any combination thereof. A processor 62 executes code stored in a program memory 64. Program memory 64 is one example of a computer-readable medium. Program memory 64 can be a volatile memory. Another form of computer-readable medium storing the same codes is a type of non-volatile storage such as floppy disks, CD-ROMs, DVD-ROMs, hard disks, flash memory, etc. Network device 60 may interface with transmission media via a plurality of interfaces 66. To implement functionality according to the present invention, interfaces 66 may incorporate processing and memory resources similar to those discussed above in connection with the network device as a whole. As packets are received, processed, and forwarded by network device 60, they may be stored in a packet memory 68. Network device 60 shown in FIG. 4 is only one example of a computer system suitable for use with the invention. Other devices and systems having different configurations of subsystems may also be utilized.

As can be observed from the foregoing, the system and method described herein have many advantages. For example, the number of admissible calls (Na) is determined by real-time measurable metrics of the network, so it is very precise for the real time network conditions. Na is also self-adaptive and, therefore, can dynamically adjust to changes in network conditions. For example, when the data traffic decreases, the number of allowed calls can be increased automatically. Furthermore, Na automatically includes other network factors, such as traffic loads, channel conditions, and multi-cell interference via the percentage of channel business and retransmissions and back-off counted in transmission time. It also accounts for local channel conditions including foreign interference that may only affect one or more APs and not the entire WLAN. Since Na is a function of N, Na has a good predictability demanded by any reliable CAC procedure.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for evaluating number of additional admissible calls for use in call admission control, comprising:
    tracking a percentage of channel busy time and transmission time of downlink and uplink voice packets;
    receiving a call admission request;
    calculating the number of admissible calls based on the percentage of channel busy time and the transmission time of downlink and uplink voice packets; and
    approving the call admission request if the number of additional admissible calls is greater than one and rejecting the call admission request if the number of additional admissible calls is less than one;
    wherein calculating the number of additional calls comprises calculating:

$Na=\min(Na1, Na2)$; where:

$Na1=dt^*(1-Pb)/(T1\_u+T1\_d)$; and $Na2=dT/T1\_d-N$;

where:
    dT is an interval of voice packets;
    N is number of admitted calls;
    Pb is the percentage of channel busy time;
    T1_u is the transmission time of downlink voice packets; and
    T1_d is the transmission time of uplink voice packets.

2. The method of claim 1 wherein the transmission time of uplink voice packets is based on a measurement received from a mobile station and averaged over a time window and number of voice clients.

3. The method of claim 1 wherein the tracking is performed at an access point of a wireless network.

4. The method of claim 1 wherein tracking the percentage of channel busy time comprises measuring the percentage of time that a receiver is busy demodulating traffic.

5. The method of claim 4 wherein tracking the percentage of channel busy time further comprises measuring a time to transmit packets and report that a channel is busy.

6. The method of claim 1 wherein tracking the percentage of channel busy time comprises tracking a moving average over a sliding time window.

7. The method of claim 1 wherein tracking the transmission time of downlink voice packets comprises measuring the time from voice packets reaching a front end of their transmission queue to receiving an acknowledgement for the downlink.

8. The method of claim 7 wherein tracking the transmission time comprises tracking a moving average of the transmission time of downlink packets over a sliding time window.

9. The method of claim 1 further comprising reserving bandwidth for roaming calls.

10. The method of claim 1 wherein tracking the percentage of channel busy time and the transmission time of downlink and uplink voice packets comprises tracking at a wireless domain services node and receiving measurement data from a plurality of access points.

11. The method of claim 1 wherein tracking the percentage of channel busy time and the transmission time of downlink and uplink voice packets comprises receiving data from a plurality of mobile stations in a wireless network.

12. A system for evaluating number of additional admissible calls for use in call admission control, comprising:
    a metrics measurement module operable to track a percentage of channel busy time and transmission time of downlink voice packets and uplink voice packets, wherein the transmission time of uplink voice packets is based on a measurement received from a mobile station and averaged over a time window and number of voice clients;
    an admission control module operable to receive a call admission request, calculate the number of additional admissible calls based on the percentage of channel busy time and an average transmission time of the downlink and uplink voice packets, and approve the call admission request if the number of admissible calls is greater than one and reject the call admission request if the number of admissible calls is less than one;
    wherein calculating the number of additional calls comprises calculating:

$Na=\min(Na1, Na2)$; where:

$Na1=dt^*(1-Pb)/(T1\_u+T1\_d)$; and $Na2=dT/T1\_d-N$; where:

dT is an interval of voice packets;
    N is number of admitted calls;
    Pb is the percentage of channel busy time;
    T1_u is the transmission time of downlink voice packets; and
    T1_d is the transmission time of uplink voice packets.

13. The system of claim 12 wherein the admission control module and the metrics measurement module are located within an access point in a wireless network and configured for receiving data from one or more mobile stations in communication with the access point with an admitted call, and a mobile station in communication with the access point and sending the call admission request.

14. The system of claim 12 wherein the admission control module is located within a wireless domain services node in communication with a plurality of access points.

15. A computer readable medium having stored thereon a sequence of instructions which, when executed by a computer causes the computer to evaluate number of additional admissible calls for use in call admission control, the instructions comprising:

code that tracks a percentage of channel busy time and transmission time of downlink and uplink voice packets;

code that receives a call admission request;

code that calculates the number of admissible calls based on the percentage of channel busy time and the transmission time of downlink and uplink voice packets; and code that approves the call admission request if the number of admissible calls is greater than one and rejects the call admission request if the number of admissible calls is less than one;

wherein code that calculates the number of admissible calls comprises code that calculates:

$$Na = \min(Na1, Na2); \text{ where:}$$

$$Na1 = dT^*(1-Pb)/(T1\_u + T1\_d); \text{ and}$$

$$Na2 = dT/T1\_d - N; \text{ where:}$$

dT is an interval of voice packets;

N is the number of admitted calls;

Pb is the percentage of channel busy time;

$T1\_u$ is the transmission time of downlink voice packets; and $T1\_d$ is the transmission time of uplink voice packets.

16. The computer readable medium of claim 15 wherein the transmission time of uplink voice packets is based on a measurement received from a mobile station and averaged over a time window and number of voice clients.

17. The computer readable medium of claim 15 wherein code that tracks the percentage of channel busy time comprises code that measures the percentage of time that a receiver is busy demodulating traffic.

18. The computer readable medium of claim 15 wherein code that tracks the transmission time of downlink voice packets comprises code that measures time from voice packets reaching a front end of their transmission queue to code that receives an acknowledgement for the downlink.

19. A system for evaluating number of additional admissible calls for use in call admission control, comprising:

means for tracking a percentage of channel busy time and transmission time of downlink voice packets and uplink voice packets, wherein the transmission time of uplink voice packets is based on a measurement received from a mobile station and averaged over a time window and number of voice clients;

means for receiving a call admission request;

means for calculating the number of admissible calls based on a channel bandwidth requirement determined from the percentage of channel busy time, and a voice packet queuing requirement determined from an average transmission time of downlink and uplink voice packets; and means for approving the call admission request if the number of admissible calls is greater than one and rejecting the call admission request if the number of admissible calls is less than one;

wherein means for calculating the number of additional calls comprises means for calculating:

$$Na = \min(Na1, Na2); \text{ where:}$$

$$Na1 = dT^*(1-Pb)/(T1\_u + T1\_d); \text{ and}$$

$$Na2 = dT/T1\_d - N; \text{ where:}$$

dT is an interval of voice packets;

N is number of admitted calls;

Pb is the Percentage of channel busy time;

$T1\_u$ is the transmission time of downlink voice packets; and $T1\_d$ is the transmission time of uplink voice packets.

20. The system of claim 19 wherein means for tracking the percentage of channel busy time comprises means for measuring the percentage of time that a receiver is busy demodulating WLAN traffic.

\* \* \* \* \*